(12) United States Patent
Zhou

(10) Patent No.: US 10,810,385 B2
(45) Date of Patent: Oct. 20, 2020

(54) METHOD, APPARATUS, SYSTEM FOR REALIZING A VIRTUAL SIM CARD, AND MOBILE TERMINAL

(71) Applicant: GUANGDONG OPPO MOBILE TELECOMMUNICATIONS CORP., LTD., Dongguan, Guangdong (CN)

(72) Inventor: Xinquan Zhou, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 16/317,299

(22) PCT Filed: Jul. 14, 2017

(86) PCT No.: PCT/CN2017/093046
§ 371 (c)(1),
(2) Date: Jan. 11, 2019

(87) PCT Pub. No.: WO2018/014796
PCT Pub. Date: Jan. 25, 2018

(65) Prior Publication Data
US 2019/0294829 A1    Sep. 26, 2019

(30) Foreign Application Priority Data

Jul. 20, 2016  (CN) .......................... 2016 1 0578529
Jul. 20, 2016  (CN) ..................... 2016 2 0772416 U

(51) Int. Cl.
*G06K 7/06* (2006.01)
*G06K 7/00* (2006.01)
(Continued)

(52) U.S. Cl.
CPC ....... *G06K 7/0021* (2013.01); *G06F 13/4282* (2013.01); *H04B 1/3816* (2013.01);
(Continued)

(58) Field of Classification Search
CPC ..... H04W 88/02; H04W 8/183; H04W 12/06; H04W 12/12; H04W 24/02;
(Continued)

(56) References Cited

U.S. PATENT DOCUMENTS 8,532,706 B2    9/2013   Kaul
2007/0153768 A1*  7/2007  Jagadesan ........... H04M 1/2535
                                                         370/352
(Continued)

FOREIGN PATENT DOCUMENTS

CN    101222712 A    7/2008
CN    101400180 A    4/2009
(Continued)

OTHER PUBLICATIONS

International Search Report and Written Opinion dated Aug. 25, 2017 for Application No. PCT/CN2017/093046.

*Primary Examiner* — Thien M Le
(74) *Attorney, Agent, or Firm* — Ladas & Parry LLP

(57) ABSTRACT

Disclosed are a method, apparatus and system for implementing a virtual SIM card, and a mobile terminal. The mobile terminal comprises a main board and a virtual SIM card chip electrically connected to the main board by means of surface-mount integration. By means of electrically connecting the virtual SIM card chip to the main board by means of surface-mount integration, the mobile terminal can realize the function of the SIM card without using a card socket or a card holder.

19 Claims, 2 Drawing Sheets

(51) Int. Cl.
*G06F 13/42* (2006.01)
*H04W 88/02* (2009.01)
*H04B 1/3816* (2015.01)
*H04W 8/18* (2009.01)

(52) U.S. Cl.
CPC ........... *H04W 8/183* (2013.01); *H04W 88/02* (2013.01); *G06F 2213/0042* (2013.01)

(58) Field of Classification Search
CPC ............... H04W 36/385; H04W 52/02; H04W 52/0274; H04W 88/06; H04W 88/08; H04W 8/205; H04W 8/22; G06G 7/122; G06K 7/0013; G06K 7/0021; H04B 1/3816; H04L 61/6054; H04L 63/0853; H04M 1/72519; H04M 1/7253; H04M 2250/14; Y02D 70/00; Y02D 70/1224; Y02D 70/1242; Y02D 70/1244; Y02D 70/1246; Y02D 70/1262; Y02D 70/142; Y02D 70/144; Y02D 70/146; Y02D 70/164; Y02D 70/166; Y02D 70/23; Y02D 70/26; G06F 13/4282; G06F 2213/0042
See application file for complete search history.

(56) References Cited

U.S. PATENT DOCUMENTS

| | | | |
|---|---|---|---|
| 2012/0108294 A1* | 5/2012 | Kaul | G06K 7/0013 455/558 |
| 2014/0335829 A1* | 11/2014 | Petridi | H04W 12/06 455/411 |
| 2016/0198321 A1 | 7/2016 | Dai | |
| 2016/0286399 A1* | 9/2016 | Biggs | H04W 36/385 |
| 2016/0330611 A1* | 11/2016 | Li | H04W 8/205 |
| 2017/0195321 A1* | 7/2017 | He | H04W 8/183 |
| 2017/0272933 A1 | 9/2017 | Zhao et al. | |
| 2018/0220293 A1* | 8/2018 | Huang | H04W 8/22 |

FOREIGN PATENT DOCUMENTS

| | | |
|---|---|---|
| CN | 201937708 U | 8/2011 |
| CN | 102970432 A | 3/2013 |
| CN | 204089900 U | 1/2015 |
| CN | 102264061 B | 7/2015 |
| CN | 104980917 A | 10/2015 |
| CN | 105120451 A | 12/2015 |
| CN | 105554687 A | 5/2016 |
| CN | 106100660 A | 11/2016 |
| CN | 205883215 U | 1/2017 |

* cited by examiner

METHOD, APPARATUS, SYSTEM FOR REALIZING A VIRTUAL SIM CARD, AND MOBILE TERMINAL

CROSS REFERENCE TO RELATED APPLICATIONS

This application is an application under 35 U.S.C. 371 of International Application No. PCT/CN2017/093046, filed on Jul. 14, 2017, which claims foreign priority to Chinese Patent Application No. 201610578529.0, filed on Jul. 20, 2016, and Chinese Patent Application No. 201620772416.X, filed on Jul. 20, 2016, the entire contents of each of which are incorporated herein by reference.

TECHNICAL FIELD

The described embodiments of the present disclosure relate to communication technology, and in particular to a method, apparatus and system for realizing a virtual subscriber identification module (SIM) card, and also to a mobile terminal.

BACKGROUND

The mobile terminal usually includes a SIM card tray or socket for the installation of a SIM card. The SIM card may be inserted in the SIM card tray, or the SIM card tray may have a cover for fixing the SIM card. For example, a multi-function electronic device may include a card socket for SIM card, and thus the electronic device has to define an installation hole for the card socket, which may influence the structural integrity of the electronic device. A gap may exist at the position of the card socket, which may cause the problem of water leakage and poor structural strength. Furthermore, due to fabrication error during actual production, the card socket for SIM card may have several problems such as metal burr, installation defects and color aberration. The SIM card installed on the SIM card socket or card tray sometimes may not be identified if the clips in the SIM card socket or card tray is in poor contact with the SIM card.

SUMMARY

The present disclosure aims to provide a method, apparatus and system for realizing a virtual SIM card, and a mobile terminal. The implementation of the present disclosure may improve the structural integrity, waterproofness of the mobile terminal, and enhance the SIM card connection.

In an aspect, a mobile terminal is provided. The mobile terminal includes: a main board; and a virtual subscriber identification module (SIM) card chip attached on the main board and electrically connected to the main board.

In another aspect, a system for realizing a virtual SIM card is provided. The system includes: a mobile terminal comprising a main board and a virtual SIM card chip, wherein the virtual SIM card chip is attached on the main board and electrically connected to the main board; a card reader coupled with the mobile terminal; and an external SIM card inserted in the card reader and configured to store SIM card information, wherein the mobile terminal identifies the SIM card information stored in the external SIM card and copy the SIM card information to the virtual SIM card chip.

In another aspect, a method for realizing a virtual SIM card is provided. The method includes: controlling a card reader by a mobile terminal to read SIM card information of an external SIM card; copying the SIM card information to a virtual SIM card chip set inside the mobile terminal; reading the SIM card information from the virtual SIM card chip and proceeding initialization.

In another aspect, an apparatus for realizing a virtual SIM card is provided. The apparatus includes: an information identification module, configured to control a card reader to acquire SIM card information of an external SIM card; an information duplication module, configured to copy the SIM card information to a virtual SIM card chip set in a mobile terminal; and an initialization module, configured to reboot the mobile terminal, read the SIM card information from the virtual SIM card chip and proceed initialization.

According to the present disclosure, a method, an apparatus and a system for realizing a virtual SIM card, and a mobile terminal may be provided. The implementation of the present disclosure may improve the structural integrity and waterproofness of the mobile terminal, and enhance the SIM card connection.

BRIEF DESCRIPTION OF THE DRAWINGS

The above and/or additional aspects and advantages of the present disclosure would be apparent and easily understood from the following description of embodiments in conjunction with the accompanying drawings, wherein.

DESCRIPTION OF REFERENCE NUMBERS

Figure 1:
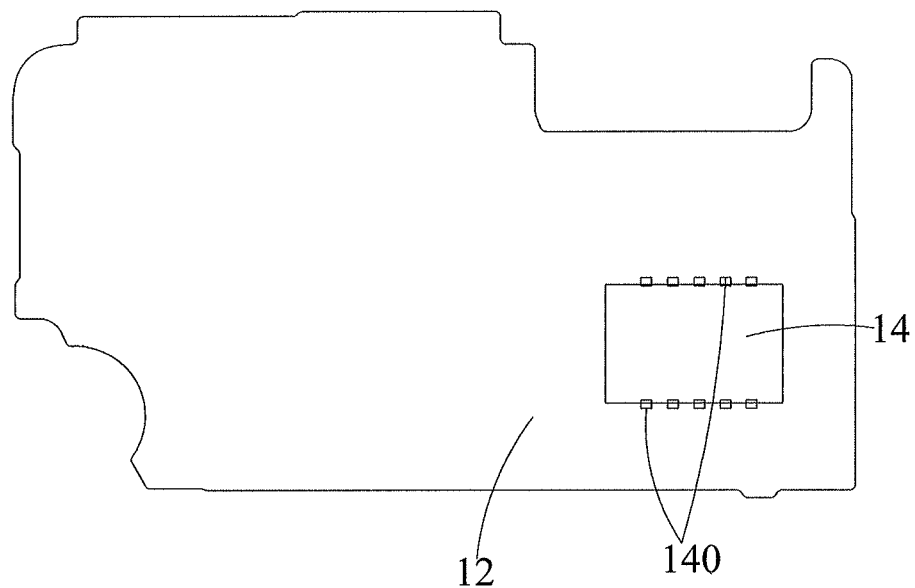
FIG. 1 illustrates a structural diagram of a virtual SIM card chip installed on a main board according to an embodiment of the present disclosure.

| | | | |
|---|---|---|---|
| 10 | mobile terminal | 20 | card reader |
| 12 | main board | 30 | data cable |
| 14 | virtual SIM card chip | 32 | USB plug |
| 140 | pin | 62 | detection module |
| 40 | information identification module | 64 | first duplication module |
| 50 | initialization module | 66 | indication module |
| 60 | information duplication module | 68 | second duplication module |

Detailed Description

The following embodiments of the disclosure will be described in detail, examples of which are shown in the accompanying drawings, in which the same or similar reference numerals have been used throughout to denote the same or similar elements or elements serving the same or similar functions. The embodiments described below with reference to the accompanying drawings are exemplary only, meaning they are intended to be illustrative of rather than limiting the disclosure.

In the specification of the present disclosure, it is to be understood that terms such as "thickness", "upper", "lower", "front", "rear", "left", "right", "vertical", "horizontal", "top", "bottom", "inner", "outer" and "circumference" refer to the orientations and locational relations illustrated in the drawings, and for describing the present disclosure and for describing in a simple manner, and which are not intended to indicate or imply that the apparatus or the elements are disposed to locate at the specific directions or are structured and performed in the specific directions, which could not to be understood as limiting the present disclosure.

In addition, terms such as "first" and "second" are used herein for purposes of description and are not intended to indicate or imply relative importance or significance or to imply the number of indicated technical features. Thus, the feature defined with "first" and "second" may include one or more of such a feature. In the description of the present disclosure, "a plurality of" means two or more than two, unless specified otherwise.

In the present disclosure, unless specified or limited otherwise, terms "mounted", "connected", "coupled", "fixed" and the like are used in a broad sense, and may include, for example, fixed connections, detachable connections, or integral connections; may also be mechanical or electrical connections; may also be direct connections or indirect connections via intervening structures; may also be inner communications of two elements, as can be understood by those skilled in the art depending on specific contexts.

For making the purpose, scheme and advantage of the present disclosure better understood, the present disclosure will be described in detail with reference to the accompanying figures and embodiments.

The present disclosure provides a mobile terminal. The mobile terminal includes a main board and a virtual subscriber identification module (SIM) card chip attached on the main board and electrically connected to the main board.

In one embodiment, the virtual SIM card chip includes a plurality of pins for data transmission. The main board comprises a plurality of pads corresponding to and connected with the plurality of pins.

In one embodiment, the pads include copper.

In one embodiment, solder paste may be pasted on the pads.

The present disclosure also provides a system for realizing a virtual SIM card. The system includes: a mobile terminal comprising a main board and a virtual SIM card chip, wherein the virtual SIM card chip is attached on the main board and electrically connected to the main board; a card reader coupled with the mobile terminal; and an external SIM card inserted in the card reader and storing SIM card information, wherein the mobile terminal identifies the SIM card information stored in the external SIM card and copies the SIM card information to the virtual SIM card chip.

In one embodiment, the virtual SIM card chip comprises a plurality of pins for data transmission; the main board comprises a plurality of pads corresponding to and connected with the plurality of pins.

In one embodiment, the pads include cooper.

In one embodiment, solder paste may be pasted on the pads.

In one embodiment, the system further includes a data cable coupled between the card reader and the mobile terminal.

In one embodiment, the mobile terminal communicates with the card reader with wireless network signals.

In one embodiment, the mobile terminal comprises a universal serial bus (USB) interface; the data cable includes a USB plug which is plugged in the USB interface so as to couple the card reader with the mobile terminal.

Figure 2:
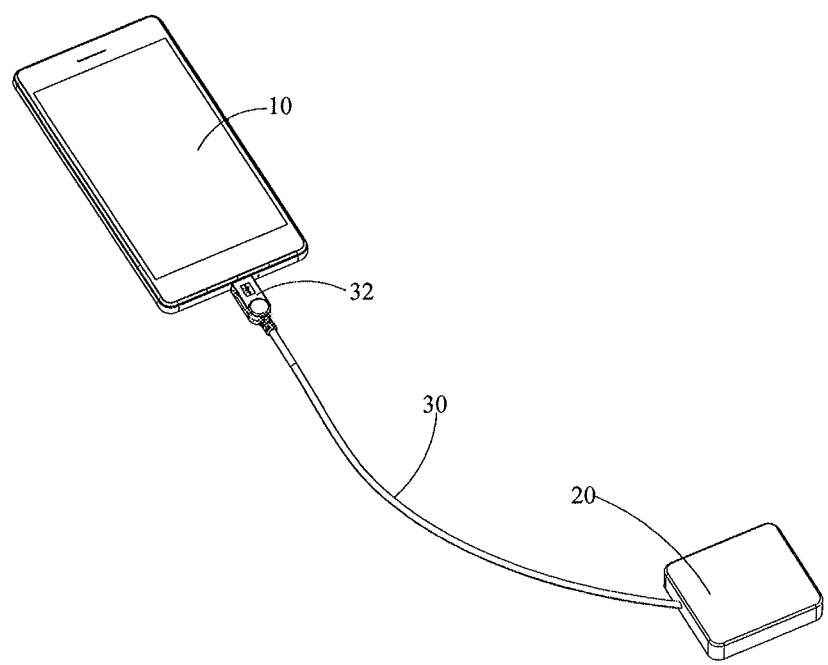
FIG. 2 illustrates a schematic diagram of a system for realizing a virtual SIM card according to an embodiment of the present disclosure.

Referring to FIGS. 1 and 2, the mobile terminal 10 of the present disclosure may include a main board 12 and a virtual SIM card chip 14. The virtual SIM card chip 14 may be attached on and electrically connected to the main board 12. Since the virtual SIM card chip 14 is attached on and electrically connected to the main board 12, the SIM card function may be achieved without usage of card socket or card tray. Thus, the integrity of the mobile terminal 10 may be improved, problems such as water leakage due to the arrangement of card tray hole may be avoided, and the problem that the SIM card cannot be identified because of the poor connection of the clip in the card socket or the card tray may be avoided. Furthermore, the implementation of the present disclosure may reduce the arrangement area required on the board of the mobile terminal 10, thereby increasing productivity and quality of the mobile terminal 10.

It should be understood, the virtual SIM card chip 14 may be an integrated circuit chip in which SIM card information may be wrote and stored.

Referring to FIGS. 1 and 2, in some embodiments, the virtual SIM card chip 14 may include multiple pins 140 for data transmission. The main board 12 may include multiple pads (not shown) corresponding and connected to the pins 140. Thus, the virtual SIM card chip 14 may be electrically connected to the main board 12 by connecting the pins 140 of the virtual SIM card chip with the pads of the main board 12. In some embodiments, the pads may be reserved for the pins 14 of the virtual SIM card chip 14 during circuit design, and may be exposed on the main board 12. The pads may be made of cooper or other conductive material.

In this embodiment, solder paste may be pasted on the pads of the main board 12 for attaching the virtual SIM card chip 14 on the main board 12, and then an equipment with surface mount technology (SMT) may be utilized to connect the pins 140 of the virtual SIM card chip 14 with the pads, such that the virtual SIM card chip 14 may be electrically connected with the main board 12.

Referring to FIGS. 1 and 2, the present disclosure also provides a system for realizing a virtual SIM card. The system may include a mobile terminal 10, a card reader 20 connected to the mobile terminal 10 and an external SIM card.

The mobile terminal 10 may include a main board 12 and a virtual SIM card chip 14. The virtual SIM card chip 14 may be attached on and electrically connected to the main board 12.

The card reader 20 may be coupled with the mobile terminal 10.

The external SIM card (not shown) may be plugged into the card reader 20, and it stores SIM card information. The mobile terminal 10 may configured to identify the SIM card information of the external SIM card, and copy the SIM card information to the virtual SIM card chip 14.

Since the virtual SIM card chip 14 is attached on and electrically connected to the main board 12, the SIM card function may be achieved without usage of card socket or card tray. Thus, the integrity of the mobile terminal 10 may be improved, problems such as water leakage due to the arrangement of card tray hole may be avoided, and the problem that the SIM card cannot be identified because of the poor connection of the clip in the card socket or the card tray may be avoided. Furthermore, the implementation of the present disclosure may reduce the arrangement area required on the board of the mobile terminal 10, thereby increasing productivity and quality of the mobile terminal 10. Moreover, the card reader 20 may be coupled with the mobile terminal 10 such that the SIM card information of the external SIM card plugged in the card reader 20 may be copied to the virtual SIM card chip 14. Thus, the virtual SIM card chip 14 may achieve the same function as the external SIM card. Thus, one-to-one correspondence between data of the mobile terminal 10 and the external SIM card may be established. Therefore, communication function or standby function of the mobile terminal 10 may be achieved through the virtual SIM card chip.

In this embodiment, the SIM card information may include data of the network operator, integrated circuit card identity (ICCID), international mobile subscriber identification number (IMSI), key identifier (KI), short message service platform (SMSP), card number, card name, phone number corresponding to the SIM card and short messages.

When the SIM card information is copied to the virtual SIM card chip 14, the above-listed information may be all copied to the virtual SIM card chip 14.

Referring to FIGS. 1 and 2, the virtual SIM card chip 14 may further include multiple pins 140 for data transmission. The main board 12 may include multiple pads (not shown) corresponding and connected to the pins 140. Thus, the virtual SIM card chip 14 may be electrically connected to the main board 12 by connecting the pins 140 of the virtual SIM card chip with the pads of the main board 12. In some embodiments, the pads may be reserved for the pins 14 of the virtual SIM card chip 14 during circuit design, and may be exposed on the main board 12. The pads may be made of cooper or other conductive material.

In this embodiment, solder paste may be pasted on the pads of the main board 12 for attaching the virtual SIM card chip 14 on the main board, and then an equipment with surface mount technology (SMT) may be utilized to connect the pins 140 of the virtual SIM card chip 14 with the pads, such that the virtual SIM card chip 14 may be electrically connected with the main board 12.

Referring to FIGS. 1 and 2, the system for realizing the virtual SIM card may further include a data cable 30 coupled between the card reader 20 and the mobile terminal 10. The data cable 30 may be utilized to connect the card reader 20 and the mobile terminal 10 such that the SIM card information may be copied to the virtual SIM card chip 14. By using the data cable 30, the transmission is not limited by network, and the SIM card information is not probably revealed. Thus, the connection is better secured, and is simple to set up.

In other embodiment, a wireless transmission method may alternatively be adopted between the card reader 20 and the mobile terminal 10 so as for copying the SIM card information of the external SIM card to the virtual SIM card chip 14. The wireless transmission method may correspond to Bluetooth, WiFi or Zigbee, which is not limited in the present disclosure.

Referring to FIGS. 1 and 2, the mobile terminal 10 may further include a universal serial bus (USB) interface (not shown). The data cable 30 may include a USB plug 32 which is plugged in the USB interface for coupling the card reader 20 and the mobile terminal 10. By connecting the USB plug 32 and the USB interface, the card reader 20 may be coupled with the mobile terminal 10, such that the SIM card information of the external SIM card may be copied to the virtual SIM card chip 14.

When the user uses the data cable 30 to copy the SIM card information, the external SIM card may be inserted in the card reader, and the USB plug 32 of the data cable 30 may be connected with the USB interface of the mobile terminal 10. Then, mobile terminal 10 may automatically identify signals from the USB interface and the card reader 20, and run the driving program 'SimMaster' so as to achieve the reading operation based on procedure.

After the above operation, the mobile terminal 10 may be rebooted. When the network operator information such as China Mobile, China Unicom, China Telecom or operators of other regions is displayed in the user interface, the SIM card information of the external SIM card may be found in the mobile terminal. In other words, the virtual SIM card chip may function as a functional block which inherits all information of the external SIM card.

The present disclosure provides a method for implementing a virtual SIM card. The method includes:

controlling a card reader by a mobile terminal to read SIM card information of an external SIM card;

copying the SIM card information to a virtual SIM card chip arranged inside the mobile terminal;

reading the SIM card information from the virtual SIM card chip and proceeding initialization.

In one embodiment, the step of reading the SIM card information from the virtual SIM card chip and proceeding initialization includes:

automatically identifying the copied SIM card information read from the virtual SIM card chip, running a driving program and generating guiding indication.

In one embodiment, the step of copying the SIM card information to a virtual SIM card chip arranged inside the mobile terminal comprises:

detecting whether there exists an idle data storage module among data storage modules of the virtual SIM card chip;

when it is detected that there exists the idle data storage module, copying the SIM card information to the idle data storage module of the virtual SIM card chip.

In one embodiment, the SIM card information includes data of the network operator, integrated circuit card identity (ICCID), international mobile subscriber identification number (IMSI), key identifier (KI), short message service platform (SMSP), card number, card name, phone number corresponding to the SIM card and short messages.

In one embodiment, the step of detecting whether there exists an idle data storage module among data storage modules of the virtual SIM card chip includes:

when it is detected that there does not exist the idle data storage module, outputting a describing information and an indicating information, wherein the describing information describes data information stored in each of the data storage modules of the virtual SIM card chip, and the indicating information indicates a user to select one of the data storage modules to store the SIM card information;

based on selection made by the user, emptying existing SIM card information in the selected data storage module; and copying the SIM card information to the selected data storage module.

Figure 3:
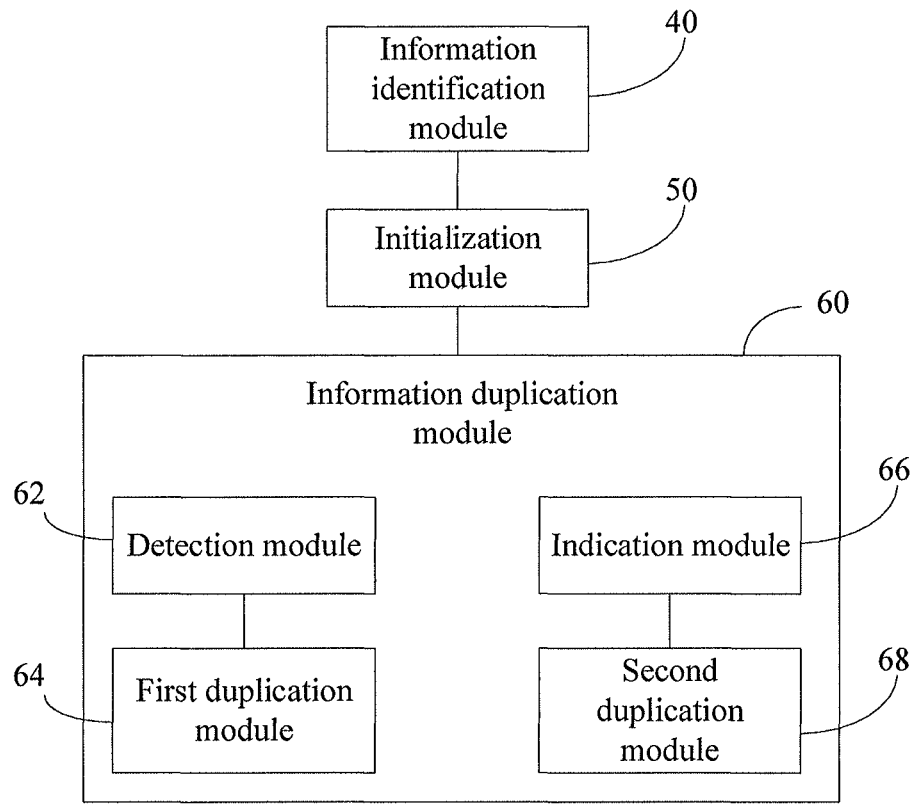
FIG. 3 illustrates a schematic diagram of an apparatus for realizing a virtual SIM card according to an embodiment of the present disclosure.

Referring to FIGS. 1 to 3, the method for realizing a virtual SIM card of the present disclosure may include the following operations.

The mobile terminal 10 may control the card reader 20 to acquire the SIM card information of an external SIM card, and to copy the SIM card information to a virtual SIM card chip 14 of the mobile terminal 10.

The mobile terminal 10 may read the SIM card information stored in the virtual SIM card chip 14, and proceed initialization.

According to the present disclosure, the mobile terminal 10 may control the card reader 20 to acquire the SIM card information of the external SIM card, and to copy the SIM card information to the virtual SIM card chip 14. Then the virtual SIM card chip 14 may read the copied SIM card information and proceed initialization after the mobile terminal is rebooted. Thus, the virtual SIM card chip 14 may inherit all the SIM card information of the external SIM card, such as the card number and the like.

In some embodiment, a data cable 30 may be coupled between the card reader 20 and the mobile terminal 10. For copying the SIM card information to the virtual SIM card chip 14, the data cable 30 may be utilized to connect the card reader 20 with the mobile terminal 10. By using the data cable 30, the transmission is not limited by network, and the SIM card information is not probably revealed. Thus, the connection is better secured, and is simple to set up.

Referring to FIGS. 1 and 2, in some embodiments, the operation of copying the SIM card information of the external SIM card to the virtual SIM card chip 14 of the mobile terminal may include:

detecting whether there exists an idle data storage module among data storage modules of the virtual SIM card chip 14; and when it is detected that there exists the idle data storage module, copying the SIM card information to the idle data storage module of the virtual SIM card chip.

Figure 4:
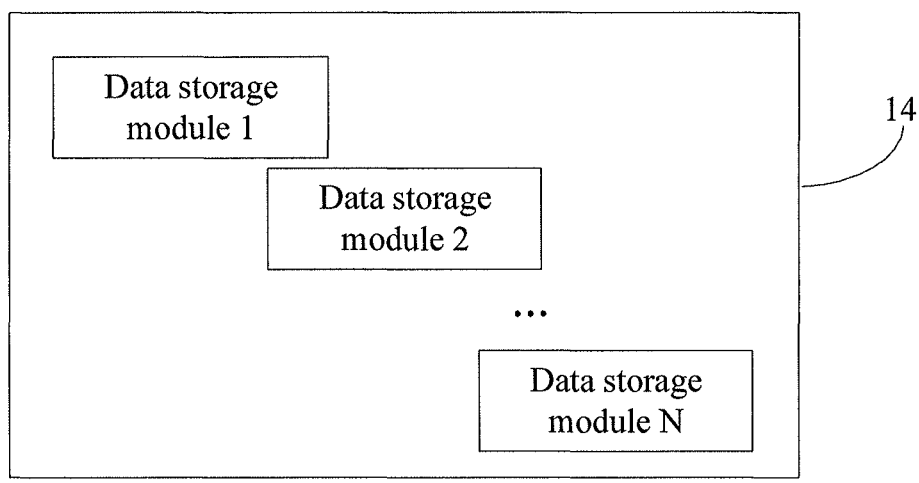
FIG. 4 illustrates a schematic diagram of multiple data storage modules of a virtual SIM card chip according to an embodiment of the present disclosure.

In this embodiment, the virtual SIM card chip 14 may be divided into multiple data storage modules, e.g., the data storage module 1, the data storage module 2 . . . the data storage module N (N refers to a natural number greater than 0), as shown in FIG. 4. By detecting whether some of the data storage modules of the virtual SIM card chip 14 are in an idle state, and copying the SIM card information to the idle data storage module during the duplication process, SIM card information related to SIM cards of different network operators may be stored in one virtual SIM card chip 14, or SIM card information related to different SIM cards of one network operator may be stored in one virtual SIM card chip 14. Therefore, the virtual SIM card chip 14 may realize the so-called single-card-multi-standby function.

It should be understood, when the external SIM card is inserted in the card reader 20, the mobile terminal 10 may control the card reader to identify the SIM card information of the external SIM card, and to detect whether some of the data storage modules of the virtual SIM card chip 14 are in the idle state. If there exists at least one idle data storage module, the SIM card information may be copied to and stored in the idle data storage module.

In some embodiments, the step of detecting whether there exists an idle data storage module among the data storage modules of the virtual SIM card chip 14 may further include:

outputting a describing information and an indicating information when it is detected that there does not exist the idle data storage module, where the describing information describes data information stored in each of the data storage modules of the virtual SIM card chip, and the indicating information indicates the user to select one of the data storage modules to store the SIM card information; and emptying existing SIM card information in the selected data storage module based on selection made by the user, and copying the SIM card information to the selected data storage module.

The user may select the data storage module for storing the SIM card information based on the indicating information so as to copy the SIM card information to the selected data storage module. Thus, the data storage modules may be reused, which may increase the usage ratio of the virtual SIM card.

The present disclosure provides an apparatus for realizing a virtual SIM card. The apparatus includes: an information identification module, configured to control a card reader to acquire SIM card information of an external SIM card; an information duplication module, configured to copy the SIM card information to a virtual SIM card chip arranged in a mobile terminal; and an initialization module, configured to reboot the mobile terminal, read the SIM card information from the virtual SIM card chip and proceed initialization.

In one embodiment, the initialization module is configured to automatically identify the copied SIM card information read from the virtual SIM card chip, run a driving program and generate guiding indication.

In one embodiment, the information duplication module includes: a detection module, configured to detect whether there exists an idle data storage module among data storage modules of the virtual SIM card chip; and a first duplication module, configured to copy the SIM card information to the virtual SIM card chip when it is detected that there exists the idle data storage module.

In one embodiment, the information duplication module further includes: an indication module, configured to output a describing information and an indicating information when it is detected that there does not exist the idle data storage module, wherein the describing information describes data information stored in each of the data storage modules of the virtual SIM card chip, and the indicating information indicates a user to select one of the data storage modules to store the SIM card information; and a second duplication module, configured to empty existing SIM card information in the selected data storage module based on selection made by the user, and copy the SIM card information to the selected data storage module.

Referring to FIGS. 2 and 3, the apparatus for realizing a virtual SIM card of the present disclosure may include an information identification module 40, an information duplication module 60 and an initialization module 50.

The information identification module 40 may be utilized to control the card reader 20 to acquire SIM card information of the external SIM card.

The information duplication module 60 may be utilized to copy the SIM card information to the virtual SIM card chip 14 of the mobile terminal 10.

The initialization module 50 may be utilized to reboot the mobile terminal 10, read the copied SIM card information from the virtual SIM card chip 14 and proceed initialization.

According to the present disclosure, the information identification module 40 may be utilized to control the card reader to acquire SIM card information of the external SIM card. The information duplication module 60 may be utilized to copy the SIM card information to the virtual SIM card chip 14. The initialization module 50 may be utilized to read the copied SIM card information from the virtual SIM card chip 14 and proceed initialization after the mobile terminal 10 is rebooted. Therefore, the virtual SIM card chip 14 may inherit all the SIM card information of the external SIM card such as card number.

In some embodiments, a data cable 30 may be electrically connected between the card reader 20 and the mobile terminal 10. For copying the SIM card information to the virtual SIM card chip 14, the data cable 30 may be utilized to connect the card reader 20 with the mobile terminal. By using the data cable 30, the transmission is not limited by network, and the SIM card information is not probably revealed. Thus, the connection is better secured, and is simple to set up.

Referring to FIGS. 2 and 3, the information duplication module 60 may further include a detection module 62 and a first duplication module 64.

The detection module 62 may be utilized to detect whether there exists an idle data storage module among data storage modules of the virtual SIM card chip 14.

The first duplication module 64 may be utilized to copy the SIM card information to the idle data storage module of the virtual SIM card chip 14 when the detection module 62 detects that there exists the idle data storage module.

In this embodiment, the virtual SIM card chip 14 may be divided into multiple data storage modules. The detection module 62 may be utilized to detect whether there exists an idle data storage module among data storage modules of the virtual SIM card chip 14. When it is detected that there exist the idle data storage module, the first duplication module 64 may be utilized to copy the SIM card information to the idle data storage module. By using the first duplication module 64 to copy the SIM card information to the idle data storage module, SIM card information related to SIM cards of different network operators may be stored in one virtual SIM card chip 14, or SIM card information related to different SIM cards of one network operator may be stored in one virtual SIM card chip 14. Therefore, the virtual SIM card chip 14 may realize the so-called single-card-multi-standby function.

It should be understood that, when the external SIM card is inserted in the card reader 20, the mobile terminal 10 may control the card reader to identify the SIM card information of the external SIM card. The detection module 62 may be utilized to detect whether there exist an idle data storage module among data storage modules of the virtual SIM card chip 14. When it is detected that there exists the idle data storage module, the first duplication module 64 may be utilized to copy the SIM card information to the idle data storage module.

Referring to FIGS. 2 and 3, the information duplication module 60 may further include an indication module 66 and a second duplication module 68.

The indication module 66 may be utilized to output a describing information and an indicating information when the detection module 62 detects that there does not exist the idle data storage module. The describing information describes data information stored in each of the data storage modules, and the indicating information indicates the user to select one of the data storage modules to store the SIM card information.

The second duplication module 68 may be utilized to empty existing SIM card information in the selected data storage module based on selection made by the user, and copy the SIM card information to the selected data storage module.

The user may select the data storage module for storing the SIM card information based on indicating information provided by the indication module 66. Then the second duplication module 68 may be utilized to copy the SIM card information to the selected data storage module. Thus, the data storage modules may be reused, and the usage ratio of the virtual SIM card chip may be increased.

The foregoing is merely some embodiments of the present disclosure, and is not intended to limit the scope of the present disclosure. The variation or modification made to any of the embodiments of the present disclosure by those of ordinary skill in the art should also be considered within the scope of the present disclosure.

What is claimed is:

1. A mobile terminal, comprising:
   a main board; and
   a virtual subscriber identification module (SIM) card chip attached on the main board and electrically connected to the main board by means of surface-mount integration, without usage of a card socket or a card tray;
   wherein the virtual SIM card chip is configured to store SIM card information copied from an external SIM card disposed out of the mobile terminal, so that the mobile terminal achieves communication and standby functions through the virtual SIM card chip.

2. The mobile terminal of claim 1, wherein the virtual SIM card chip comprises a plurality of pins for data transmission; the main board comprises a plurality of pads corresponding to and connected with the plurality of pins.

3. The mobile terminal of claim 2, wherein the plurality of pads are made of copper.

4. The mobile terminal of claim 2, wherein solder paste is arranged on the plurality of pads.

5. The mobile terminal of claim 2, wherein
   the virtual SIM card chip comprises a plurality of data storage modules capable of storing SIM card information of different external SIM cards.

6. The mobile terminal of claim 1, wherein
   the virtual SIM card chip is an integrated chip configured to store SIM card information of at least one external SIM cards.

7. A system for realizing a virtual subscriber identification module (SIM) card, comprising:
   a mobile terminal comprising a main board and a virtual SIM card chip, wherein the virtual SIM card chip is attached on the main board and electrically connected to the main board by means of surface-mount integration, without usage of a card socket or a card tray;
   a card reader coupled with the mobile terminal and disposed out of the mobile terminal; and
   an external SIM card disposed out of the mobile terminal and inserted in the card reader and storing SIM card information, wherein the mobile terminal identifies the SIM card information stored in the external SIM card and copies the SIM card information to the virtual SIM card chip, so that the mobile terminal achieves communication and standby functions through the virtual SIM card chip.

8. The system of claim 7, wherein
   the virtual SIM card chip comprises a plurality of pins for data transmission;
   the main board comprises a plurality of pads corresponding to and connected with the plurality of pins.

9. The system of claim 8, wherein the plurality of pads are made of copper.

10. The system of claim 8, wherein solder paste is arranged on the plurality of pads.

11. The system of claim 7, further comprising: a data cable coupled between the card reader and the mobile terminal.

12. The system of claim 11, wherein the mobile terminal comprises a universal serial bus (USB) interface; the data cable comprises a USB plug which is plugged in the USB interface for coupling the card reader with the mobile terminal.

13. The system of claim 7, wherein the mobile terminal communicates with the card reader with wireless network signals.

14. The system of claim 7, wherein
the virtual SIM card chip comprises a plurality of data storage modules;
each of the plurality of data storage modules is capable of storing SIM card information of one respective external SIM card.

15. A method for realizing a virtual subscriber identification module (SIM) card, comprising:
controlling a card reader by a mobile terminal to read SIM card information of an external SIM card, wherein the card reader and the external SIM card are disposed out of the mobile terminal;
copying the SIM card information to a virtual SIM card chip, so that the mobile terminal achieves communication and standby functions through the virtual SIM card chip, wherein the virtual SIM card chip is an integrated chip arranged inside the mobile terminal by means of surface-mount integration, without usage of a card socket or a card tray;
reading the SIM card information from the virtual SIM card chip and proceeding initialization.

16. The method of claim 15, wherein the reading the SIM card information from the virtual SIM card chip and proceeding initialization comprises:
automatically identifying the copied SIM card information read from the virtual SIM card chip;
running a driving program; and
generating guiding indication.

17. The method of claim 15, wherein the copying the SIM card information to the virtual SIM card chip arranged inside the mobile terminal comprises:
detecting whether there exists an idle data storage module among data storage modules of the virtual SIM card chip;
when it is detected that there exists the idle data storage module, copying the SIM card information to the idle data storage module of the virtual SIM card chip.

18. The method of claim 17, wherein the detecting whether there exists the idle data storage module among the data storage modules of the virtual SIM card chip comprises:
when it is detected that there does not exist the idle data storage module, outputting a describing information and an indicating information, wherein the describing information describes data information stored in each of the data storage modules of the virtual SIM card chip, and the indicating information indicates a user to select one of the data storage modules to store the SIM card information;
based on selection made by the user, emptying existing SIM card information in the selected data storage module; and
copying the SIM card information to the selected data storage module.

19. The method of claim 15, wherein the SIM card information includes data of a network operator, integrated circuit card identity (ICCID), international mobile subscriber identification number (IMSI), key identifier (KI), short message service platform (SMSP), card number, card name, phone number corresponding to the SIM card and short messages.

\* \* \* \* \*